(12) United States Patent
Ross et al.

(10) Patent No.: US 8,170,931 B2
(45) Date of Patent: May 1, 2012

(54) CONFIGURING USER-CUSTOMIZED SERVICES FOR NETWORKED DEVICES

(75) Inventors: Mark Andrew Ross, San Carlos, CA (US); Timothy Bucher, Geyserville, CA (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 12/259,471

(22) Filed: Oct. 28, 2008

(65) Prior Publication Data

US 2010/0106628 A1 Apr. 29, 2010

(51) Int. Cl.
G07B 17/00 (2006.01)
G06Q 30/00 (2006.01)

(52) U.S. Cl. .......................... 705/30; 705/10

(58) Field of Classification Search ............ 705/30
See application file for complete search history.

(56) References Cited

U.S. PATENT DOCUMENTS

| | | | |
|---|---|---|---|
| 2005/0044016 A1* | 2/2005 | Irwin et al. | 705/30 |
| 2005/0081029 A1 | 4/2005 | Thornton et al. | |
| 2007/0086431 A1* | 4/2007 | Abu-Amara | 370/352 |
| 2007/0155307 A1* | 7/2007 | Ng et al. | 455/3.01 |
| 2007/0161402 A1* | 7/2007 | Ng et al. | 455/554.2 |
| 2008/0082421 A1* | 4/2008 | Onyon et al. | 705/14 |
| 2009/0037008 A1* | 2/2009 | Moorer et al. | 700/94 |
| 2009/0044016 A1* | 2/2009 | Vauclair | 713/176 |
| 2009/0063314 A1* | 3/2009 | Wang et al. | 705/30 |
| 2009/0150406 A1* | 6/2009 | Giblin | 707/10 |
| 2009/0216621 A1* | 8/2009 | Anderson et al. | 705/10 |
| 2009/0327059 A1* | 12/2009 | Grigorovitch | 705/14.15 |
| 2010/0036759 A1* | 2/2010 | Ben-Yaacov et al. | 705/30 |
| 2010/0076873 A1* | 3/2010 | Taylor et al. | 705/30 |

FOREIGN PATENT DOCUMENTS

WO WO 99/15947 4/1999

OTHER PUBLICATIONS

WO 99/15947, Software License Control System Based on Independent Software Registration Server, Park et al., Sep. 19, 1097.*
U.S. Appl. No. 12/259,876, filed Oct. 28, 2008, Ross et al.
U.S. Appl. No. 12/259,876, filed Jul. 12, 2011, Office Action.
U.S. Appl. No. 12/259,876, filed Oct. 19, 2011, Final Office Action.

* cited by examiner

*Primary Examiner* — Garcia Ade
(74) *Attorney, Agent, or Firm* — Workman Nydegger

(57) ABSTRACT

Systems and methods for managing one or more aspects of a user's relationship with one or more media devices or other information handling systems and one or more media content providers. In some embodiments, a service center functions as a central management point and includes various modules configured to provide the management services.

12 Claims, 5 Drawing Sheets

CONFIGURING USER-CUSTOMIZED SERVICES FOR NETWORKED DEVICES

CROSS-REFERENCE TO RELATED APPLICATIONS

Not applicable.

BACKGROUND

1. The Field of the Invention

The present invention relates generally to portable media devices. More specifically, embodiments of the present invention relate to methods and systems for interfacing portable media devices with media content providers.

2. The Relevant Technology

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One of the advantages afforded by technological improvements is the ability to distribute to digital media. However, the ability of information handling systems to distribute digital media has not kept pace with the ways in which digital media can be distributed, the wide variety of digital media, or with the growing diversity among media devices.

For example, digital media (e.g., music, video, Internet data, sports data, news data, weather data, etc.) can be distributed to media devices via various networks including the Internet as well as wireless communication, such as satellite radio, WiFi, cellular networks, and the like. Given the diversity of media devices and media content, many different types of devices have been developed to enjoy the growing availability of digital media, including MP3 players, portable CD players, portable DVD players, notebook computers, cellular telephones, personal digital assistants (PDAs), are examples of such devices. Digital media can also be enjoyed on other non-portable devices as well such as on desk top computers.

Oftentimes, a particular user will employ numerous media devices for receiving various types of media content. Unfortunately, as the number of media devices increases, so does the time required to manage the relationship between each device and the various media content providers that provide content to each device. For example, the user often must access each individual media content provider and set up an account or the like before a device can receive any services. This often must be repeated for each device the user owns.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment disclosed herein relates to a service center for managing the relationship between users of media devices and the content on the media devices, the content being provided by one or more media content providers. The service center comprises a processor, one or more transceivers for transferring data between the service center and the one or more media devices and between the service center and the one or more media content providers, one or more memory modules for storing data received from the one or more media devices and the one or more media content providers, and one or more management modules configured to cause the service center to at least partially manage one or more aspects of a user's relationship with one or more media devices and/or one or more of media content providers.

Another embodiment disclosed herein relates to a method for managing a user's relationship with one or more media devices and/or one or more of media content providers. The method may be practiced in a system that includes one or more media devices that receive content or services from one or more media content providers. The method comprises identifying one or more media devices associated with a user, identifying one or more media content providers configured to provide content or services to the media devices, and managing one or more aspects of the user's relationship with the one or more media devices and/or the one or more of media content providers such that the one or more media devices are configured to receive content or services from the one or more media content providers.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of the present invention For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
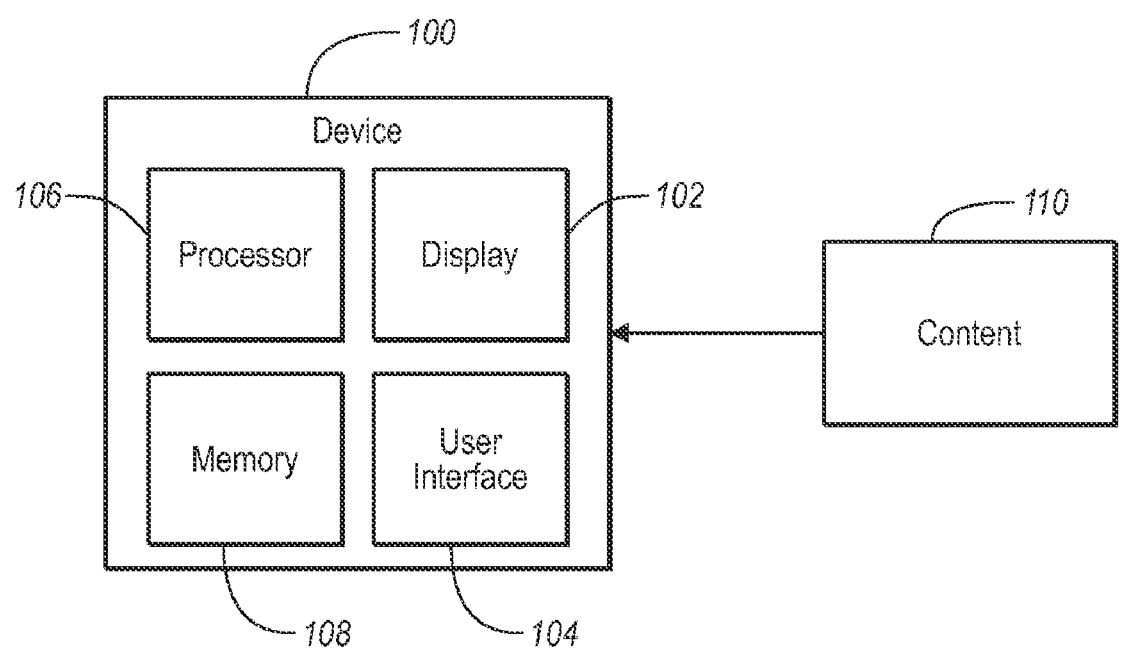
FIG. 1 illustrates a schematic drawing of a media device.

FIG. 1 illustrates an embodiment of a media device that can receive content including digital media from one or more sources. Examples of the media device 100 may include, by way of example, a satellite radio device, a portable audio player (such as a MP3 player or iPod), a portable DVD or CD player, a personal computer, a laptop computer, a server computer, a cellular telephone, a personal digital assistant (PDA), and the like or any combination thereof. Embodiments of the invention generally refer to media devices, but one of skill in the art can appreciate that embodiments of the invention can be used with other types of information handling systems able to receive and render media content.

Typically, the media device 100 includes a display 102 that can convey information to the user of the media device. For example, when the media device 100 renders digital audio data, the display 102 may indicate the song title, the artist, the album title, the track number, the length of the track, and the like or any combination thereof. The media device 100 also includes a user interface 104 (such as control buttons, touch screen, capacitive input, etc.) or other means of providing input to the media device 100. The user interface 104, by way of example, enables a user to navigate and activate the digital media and other content that is stored on the memory 108 of the media device 100 or to navigate and perform any digital media or content that is received from an external source. The user interface 104 may enable a user to switch to another channel, such as in satellite radio, or otherwise select media content.

The media device 100 may further include a processor 106. The processor 106 by way of example, enables media device 100 to execute various programs as circumstances warrant. In addition, the processor 106 may be utilized by one or more of the other modules or elements of media device 100 for processing operations.

The memory 108 of the media device, which may include volatile and non-volatile memory or any combination thereof, can be used to store content or other user and/or media device data. The memory 108, for example, may store digital music and/or video, graphics, play lists, user preferences, device settings, and the like or any combination thereof.

The content 110 represents different types of media including digital media that may be received by the media device 100. Examples of the content 110 include, but are not limited to, digital music, talk audio data, television data, movie data, podcasts, sports data, weather data, news data, Internet data, and the like or any combination thereof. The content 110 can be either digital or analog in nature.

Figure 2:
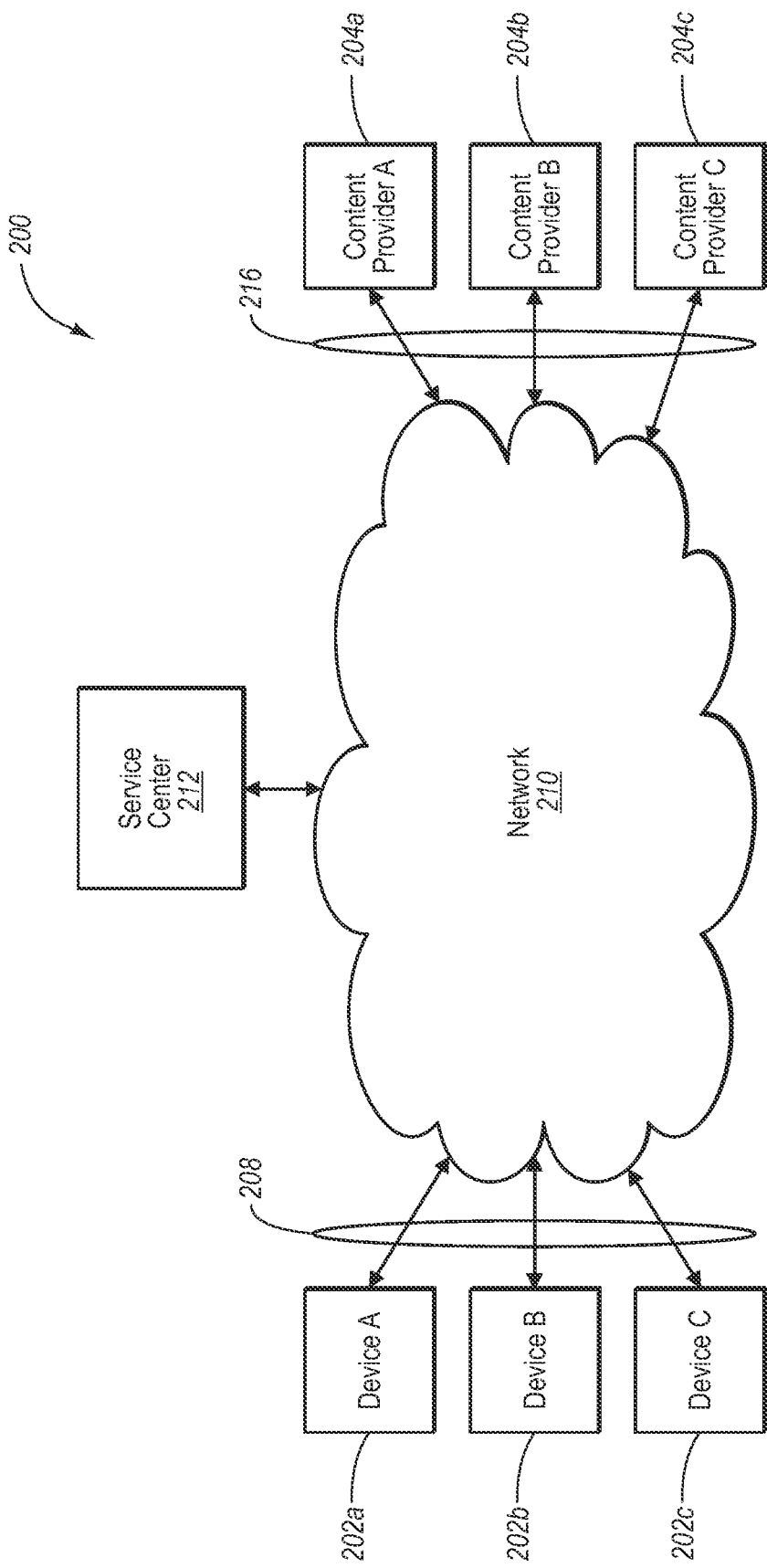
FIG. 2 illustrates a system including a service center configured to manage the relationship between one or more media devices and one or more media content providers that provide content to the media devices.

FIG. 2 illustrates one example of an environment for implementing embodiments of the invention. FIG. 2 includes a system 200 for enabling multiple media devices 202a, 202b and 202c to receive one or more services from multiple media content providers 204a, 204b and 204c. The system 200 also includes a service center 212, which may be executing on server computer(s), for interfacing between the media devices 202 and the media content providers 204. The service center 212 may communicate with the media devices 202 directly, or through a network 210, as illustrated in FIG. 2. Likewise, the service 212 may communicate with the media content providers 204 directly, or through the network 210, as further illustrated in FIG. 2.

The media devices 202 may include, for example, any of the media devices described in reference to FIG. 1. The media content providers 204 are representative of media sources providing digital media that may be received by the media devices 202. The media content providers 204 may be sources through which a user may obtain music, Internet data, video, podcasts, text data, and the like or any combination thereof. Exemplary media content providers 204 may include, by way of example, satellite sources including digital radio and video, terrestrial sources, internet service providers, music downloads services, peer to peer networks, and the like or any combination thereof. The media content providers 204 may include free services that may be accessed free of charge. Alternatively, the media content providers 204 may include pay services that may only be accessed by clients who are billed a predetermined amount, for example, a monthly charge, or a charge that is based on volume of usage. Furthermore, the media content providers 204 may either provide open access to the public, or may require user authentication. As will be appreciated, for those media content providers that require user authentication, no content or services will be provided to a media device 202 that does not provide the proper authentication.

The network 210 represents any network that is compatible with the media devices 202 or the media content providers 204 and may include, by way of example, satellite networks, 802.11 networks, personal computer networks (e.g., LAN, WAN), wireless networks (e.g., Bluetooth, WiFi), cellular networks, telephony networks (e.g., landline or PSTN), data networks, the Internet, and the like or any combination thereof.

The service center 212 receives one or more data streams 208 from one or more of the media devices 202, and likewise receives one or more data streams 216 from one or more of the media content providers 204. Exemplary data streams 208 and 216 include, by way of example, wired and wireless computer networks (LAN, WAN, Internet, WiFi, WiMax, EVDO, Edge Networks, GPRS, and the like), satellite signals, terrestrial signals, and the like or any other reasonable data stream.

Although illustrated as a single entity, the service center 212 can be implemented in a distributed computing environment where tasks are performed by local and remote processing devices that are linked (either by hardwired links, wireless links, or by a combination of hardwired and wireless links) through a communications network. Additionally, the service center may store information about the media devices 202 so that the media devices may receive one or more services or content from the media content providers.

Figure 3:
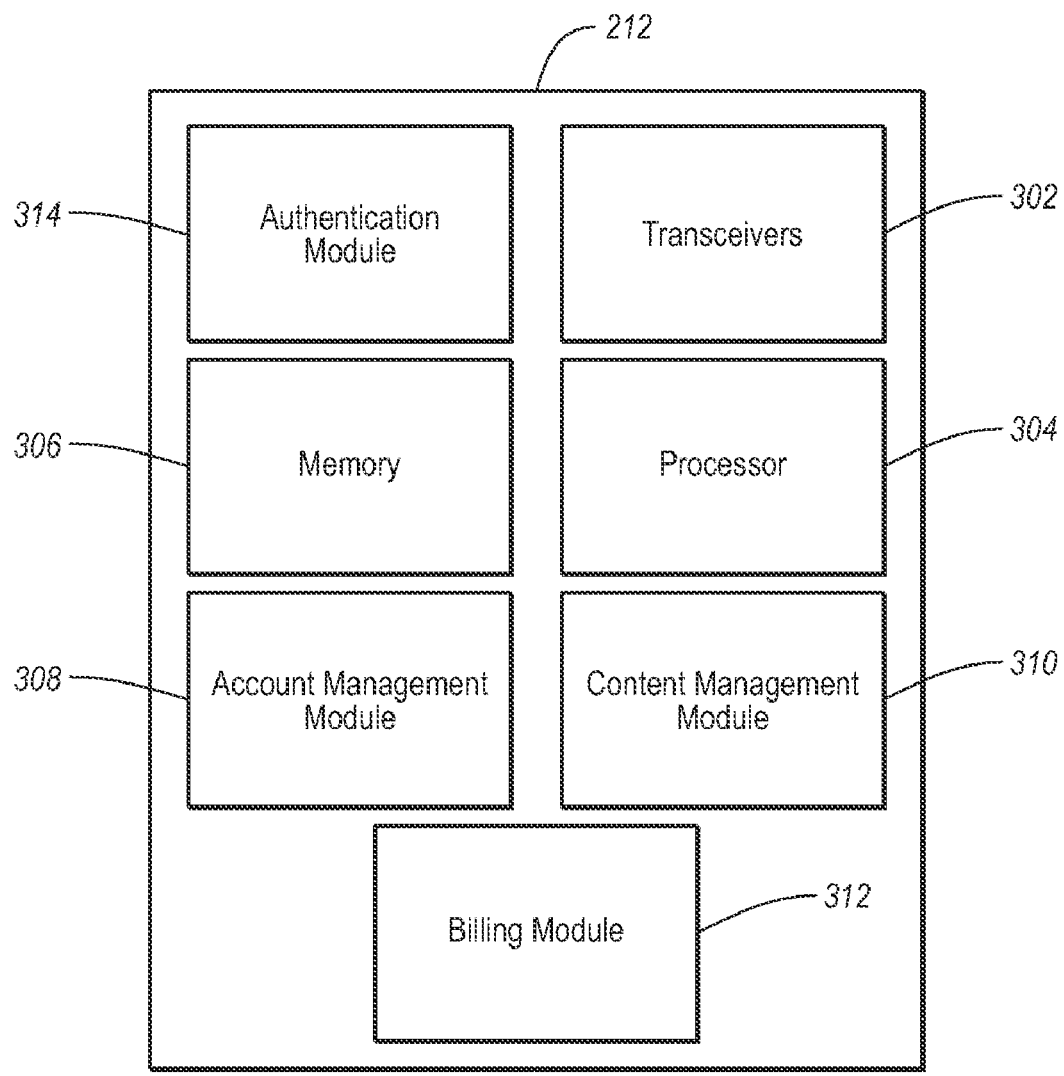
FIG. 3 illustrates a schematic drawing of an embodiment of the service center of FIG. 2.

Referring now to FIG. 3, a more detailed depiction is provided of the service center 212. The service center 212 may include one or more transceivers 302 for transferring data between itself and one or more portable media devices and also between itself and one or more media content providers. The transceivers 302 may include both wired and wireless transceivers for communicating with any of the network 210, media devices 202 and media content providers 204. The service center 212 may further include one or more memory modules 306, which may be volatile or non-volatile memory, for storing data received from the media devices 202 and from the media content providers 204. For instance, the memory 306 may include one or more mapping tables including information about media devices 202 and/or media content providers 204. The interface service 212 may also include a processor 304 configured to provide general purpose processing for the various modules of the service center as circumstances warrant.

In some embodiments, the service center 212 may include additional management modules configured to help the service center function as a central point for the management of various aspects of a user's relationship with one or more of the media devices 202 and/or one or more of the media content providers 204. These additional management modules may be comprised of software, hardware, or any combination of software and hardware. In addition, although the additional management modules are illustrated as being separate, this is not required. It will be appreciated that one or more of the management modules may be combined as circumstances warrant.

As illustrated, service center 212 may include an account management module 308. The account management module may be configured to store account information about a user in memory 306 or some other accessible memory. Account management module 308 may be configured to allow a user to configure one or more of the media devices 202 to receive desired content from the media content providers 204. In addition, the account management module may allow a user to associate multiple additional users with his or her account and to associate additional media devices 202 with these users. Further, the account management module 308 may allow the user to control the purchasing capabilities of one or more of the multiple additional users.

In operation, a user may have an existing account at service center 212 or may access service center 212, specifically account management module 308, through use of a media device 202 or through some other suitable means to set up an account. The user may then provide user information, for example name, address, payment information and the like, and may provide other required information to set up the account. For example, the user may specify what content or services he or she desires from specific media content providers 204. The user may also specify desired configuration settings for a media device 202 such as settings that allow the media device to receive certain types of content or services or that specify communication and network settings. It will be appreciated that there are numerous device configuration settings that may be specified.

In some embodiments, the user, either while connected to service 212 while creating an account or at a later time, may use account management module 308 to associate one or more media devices 202 with the user's account. For example, referring to FIG. 2, the user may provide user input that causes account management module 308 to associate media devices 202a and 202b with the user. Once the media devices are associated with the user, the account management module 308 will cause both media devices 202a and 202b to be configured with the specified setting previously described. Thus, the media devices 202a and 202b will be similarly configured for operation. At a later time, the user may cause that media device 202c be associated with the user account, at which time media device 202c will also be configured the same as media devices 202a and 202b.

It will be appreciated that the media devices 202a, 202b, and 202c need not be all configured the same. For instance, in some embodiments the user may desire different settings for each media device. The user may cause account management module 308 to specify different setting for each media device. Advantageously, account management module 308 provides a central point for a user to configure one or more media devices without having to configure each media device separately. In other words, all of the media devices that become associated with the account may be configured automatically by the account management module 308 in the manner specified by the user.

In further embodiments, account management module 308 may be configured to associate more than one user with the account. This may be especially useful for a family or other type of closely associated group of people that desire to use the same account. For example, as previously explained the user who creates the account will typically be associated with the account. Suppose this user is the husband. The user may provide input to the account management module 308 that associates the user's wife and three children with the account. In addition, the account management module 308 may associate one or more media devices 202 with the wife and three children. For instance, the wife may have three media devices 202 associated with her while the children have two media devices 202 associated with each of them. In this way, the wife and three children may have access to the configuration settings of the husband and may have their various media devices automatically configured by these settings.

In some embodiments, the account module 308 may structure these associations as a tree structure or other suitable data structure that may be stored in memory 306. Using a tree structure may allow one or more of the users to set inheritance settings for other users that are in branches of the tree beneath the user.

Figure 5:
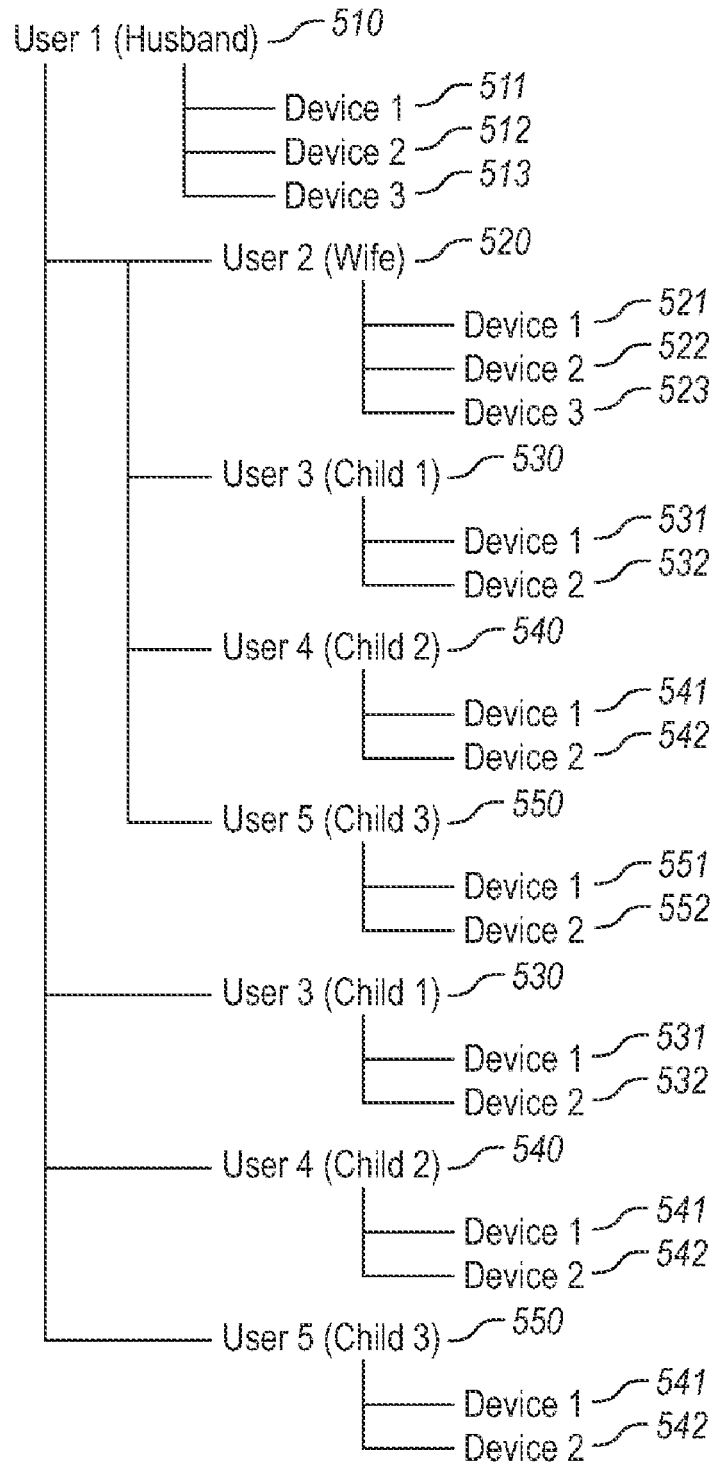
FIG. 5 illustrates a tree structure in accordance with embodiments disclosed herein.

FIG. 5 illustrates an example tree structure 500, which uses the example mentioned above by supposing that the first user is the husband of the family. As illustrated, user 1 or the husband, designated at 510, may have three media devices 511, 512, and 513 associated with him. In addition, user 2 or the wife, designated at 520 and users 3, 4, and 5 or the three children, designated at 530, 540, and 550, are illustrated as branches beneath the husband 510. The wife 520 has three media devices 521, 522, and 523 associated with her. The child 530 has two media devices 531 and 532 associated with him or her, the child 540 has two media devices 541 and 542 associated with him or her, and child 550 has two media devices 551 and 552 associated with him or her. It will be appreciated that the various media devices illustrated in FIG. 5 may correspond to one of the media devices 202 previously described.

In this example, the husband 510 may specify that all of his settings are available to the wife 520 and to all three of her media devices 521, 522, and 523. In addition, the husband 510 may set limitations on some settings that are available or inherited by the three children 530, 540, and 550 and/or their media devices 531, 532, 541, 542, 551, and 552. It will be appreciated that the husband 510 may set different limitations for each of the children 530, 540, and 550 as circumstances warrant. The account management module 308 will ensure that these inheritance settings are provided to the appropriate media devices.

As further illustrated in FIG. 5, the tree structure 500 shows that the three children 530, 540, and 550 and their associated media devices are also branches beneath the wife 520. Accordingly, the wife 520 may be able to set inheritance settings for the three children in a manner similar to the husband 510. In some embodiments, the wife 520 may also be able to share any unique settings with the husband 510 as circumstances warrant. Advantageously, this allows the husband or wife to control what media service providers the children may access by controlling which setting are made available to the children.

In additional embodiments, account management module 308 may be used to control the purchasing capabilities of one or more of the multiple additional users. For example, the user may associate the account with a credit card or other form of payment. The user may then specify the amount of money that each user may spend in a given time period. This information may be stored by account management module 308 and accessed whenever a media device 202 associated with the account desires to make a purchase.

For instance, in the family example discussed above, the husband may specify that he and the wife may have unlimited purchasing permission using the credit card while the three children are limited to a $10 credit per month. When a media device 202 associated with the husband or wife desires to make a purchase, account management module 308 may determine that these media devices have unlimited purchasing permission and will allow the credit card to be used. On the other hand, if a media device 202 associated with one of the children desires to make a purchase using the credit card, then account management module 308 will only allow the credit card to be used if the $10 limit has not and will not be surpassed. Alternatively, in some embodiments, the $10 credit per month may be allowed to accumulate if not spent. For example, one of the children may not spend his or her credit for three months, thus creating a credit of $30. If a media device 202 associated with this child desires to make a purchase using the credit card, then account management module 308 will only allow the credit card to be used if the $30 limit has not and will not be surpassed. Any unused portion may then accumulate with the next month's $10 credit. In some embodiments, the user may specify a total amount that may accumulate to ensure that the child may not spend too large an amount at one time. Advantageously, this process allows the user to control the purchasing capabilities as described without the need to use prepaid payment cards or the like or to have separate payment accounts for each user as is typical in many existing services.

In still further embodiments, account management module 308 may provide content access control. For example, the user may provide input to account management module 308 that specifies what types of content people and/or media devices associated with the account may access. The account management module may then configure the media devices 202 so that media devices may only receive content or services that are allowed. Thus, the user may restrict any of the additional user's access to content or services provided by media content providers 204 that are age appropriate for that user.

Returning again to FIG. 3, service center 212 may also include a content management module 310. The content management module 310 may be configured to give a user the ability to control various aspects of the content or services that are received by a media device 202. For example, in some embodiments the content management module 310 may allow the user to identify favorite content and to make one or more lists of this content. The content management module may also allow a user identify types of desired content to receive.

For example, in some embodiments the media content providers 204a and 204b may allow a user to create a listing of favorites from the content provided by these sources. For instance, if both media content providers 204a and 204b were internet radio sources, then perhaps the favorites lists would each list one or more favorite songs. Content management module 310 may allow the user to identify a sub-portion of the favorites lists of media content providers 204a and 204b. The media content management module may then create a favorites list based on an aggregation of the identified favorites. In this way, the user is able to create a favorites list that is independent of the interface of media content provider 204a and 204b. This new list may be provided to all the media devices associated with the user by the use of account management module 308 or some other suitable means.

In still other embodiments, content management module 310, sometime in conjunction with account management module 308, may be used by the user to identify desired content. For example, a user may provide input that identifies the types of content a user is interested in receiving from the media content providers 204. The content management module 310 may then configure the user's media device(s) 202 to receive the identified content. The media device 202 may then contact the media content providers directly over network 210 to receive the identified content.

For instance, suppose that user desired to subscribe to one or more podcasts. The user would enter input into content management module 310 that identified the desired podcasts. The content management module 310 would then configure those media devices 202 associated with the user to be able to access the podcasts from the media content provider 204 that provided the content.

In additional embodiments, the content management module may allow a user to specify content for one or more media devices 202. For example, the user may have a collection of photographs stored on a media device 202 or a media provider 204. The user may provide input to content management module 310 that may cause the module to associate one or more media devices 202 with the collection of photographs. Theses media devices 202 may then be able to access and view the collection of photographs.

As further illustrated, service center 212 may further include a billing management module 312. The billing management module 312 may be configured handle billing arrangements with paid content and services. The module may also track the usage of the paid content or services received by a media device 202. The module may further facilitate appropriate payment to the media content provider 204 that provided the paid content or services.

In operation, a user may access service center 212, specifically billing module 312, with a media device 202 or other suitable means to arrange billing arrangements with one or more media content providers 204 that provide paid content or services. For example, the user may select these services and may then provide a form of payment such as a credit card or authorization to access a bank account or the like. The billing module 312 may then communicate that payment arrangements have been made to the media content providers 204 and may further configure any media devices 202 associated with the user so that these media devices will be able to access the paid content or services directly from the media content providers.

The user of the media devices 202 may then access the paid content from the media content providers. For instance, the user of media device 202a may receive paid radio service from media content provider 204a and paid video service from media content provider 204b. In addition, the user may also access the paid content or services using any other media device 202 associated with him or her. The billing module 312 may then cause service center 212 to provide the appropriate payment for these services directly to media content providers 204a and 204b using the form of payment previously discussed. Advantageously, the user is not required to set up a separate billing and payment arrangement with media content providers 204a and 204b. Rather, the billing module 312 allows the service center 212 to act as a single point for facilitating billing and payment relationships between all of the media devices 202 associated with a user and multiple media content providers 204 that require payment for their content and services.

In some embodiments, a user may desire to subscribe to a number of paid services provided by the media content providers that require regular payments. For instance, the media content providers may require a monthly subscription fee. In such cases, the billing module 312 may act as a single payment point for the number of paid services. That is, the billing module 312 may keep track of the various paid services the user has selected and may communicate with the media content providers to determine the required fee for the services or content. At the appropriate time, for example at the beginning of every month, the billing module 312 may cause the service center 212 to provide the various subscription fees to the various media content providers 204. As mentioned above, the user is not required to provide the regular payments to each media content provider separately as the service center 212 acts as a one point billing service As will be appreciated, although the user may subscribe to the multiple paid services, he or she may not always use the services that have been paid for. For example, if media content provider 204a provided paid music content and media content provider 204b provided paid video content, then perhaps in a given month the user may access the music content many times but not access the video content at all or for a very limited amount of time. In such circumstances, the user may still have to pay the entire periodic subscription fee to the media content provider 204b even though he or she did not use the service.

Accordingly, in some embodiments the billing module 312 may be configured to determine how much of a service a media device 202 and/or a user has actually used and provide payment based on actual usage. For instance, the media devices 202 may include a tracking module that tracks actual usage of services and content provided by a media provider 204. The billing module 312 may communicate with the media device 202 and determine the amount of usage based on the tracking module. The billing module 312 may then cause a higher payment to be provided to those media content providers whose services and content is actually being used while perhaps providing a lower payment or no payment to a service that was not used or that was used only a very little. In this way, the user is able to avoid paying for services that are not used while the services that are used are able to receive a higher payment.

In some embodiments, service center 212 may also include an authentication module 314. The authentication module 314 may be configured to ensure that one or more of the media devices 202 are properly authenticated such that the media devices 202 may be able to receive content or services from the media providers 204. For example, the authentication module may communicate with the media providers 204 to determine what information is needed for authentication. This information may then be provided to the media devices 202 upon request. The authentication module 314 may be comprised of software, hardware, or any combination of software and hardware as circumstances warrant. The operation of the authentication module 314 is further described in commonly owned, co-pending U.S. patent application Ser. No. 12/259,876, filed herewith on Oct. 28, 2008, herein incorporated by reference in its entirety.

Figure 4:
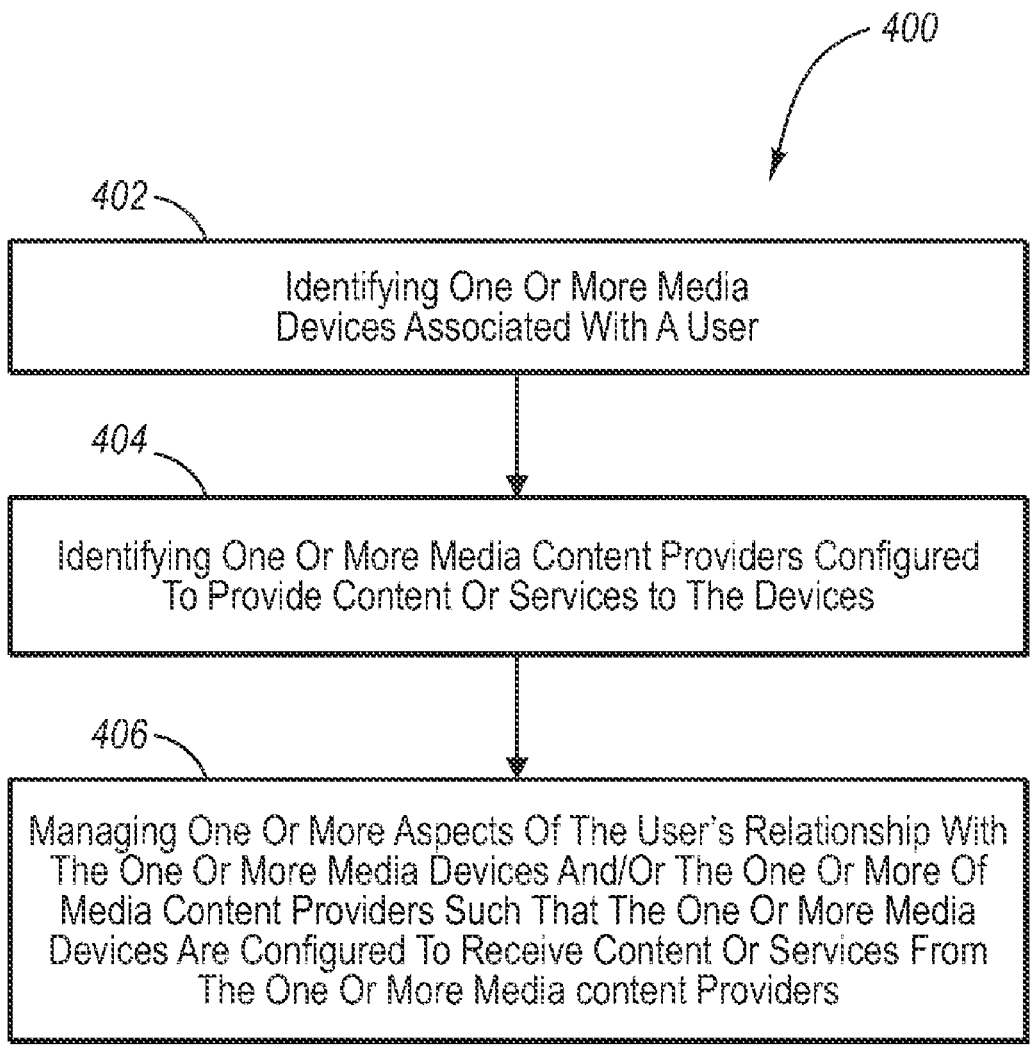
FIG. 4 illustrates a flow chart of a method for managing one or more aspects of a user's relationship with one or more media devices and/or one or more media content providers in accordance with embodiments disclosed herein.

Reference is now made to FIG. 4, which illustrates a method 400 for a system including one or more media devices that receive content or services from one or more media content providers to manage a user's relationship with the media devices and/or the media content providers. The one or more media devices may include one of a satellite radio device, a portable audio player, a portable DVD or CD player, a personal computer, a laptop computer, a server computer, a cellular telephone, a personal digital assistant (PDA), or any combination thereof.

The method includes identifying 402 one or more media devices associated with a user. For example, service center 212 may identify one or more of the media devices 202 that are associated with a user.

The method 400 also includes identifying 404 one or more media content providers configured to provide content or services to the media devices. For example, the service center 212 may identify one or more of the media content providers 204 that are configured to provide content or services to the media devices 202.

The method 400 further includes managing 406 one or more aspects of the user's relationship with the one or more media devices and/or the one or more of media content providers such that the one or more media devices are configured to receive content or services from the one or more media content providers. For example, service center 212 and its various management modules may provide management of the user's relationship with the media devices 202 and/or the media content providers 204.

In one embodiment, managing 406 one or more aspects of the user's relationship with the one or more media devices and/or the one or more of media content providers comprises associating one or more additional users with an account of the user and associating one or more media devices with the additional users. As previously described, additional users may become associated with the user's account and may also have one or more media devices associated with them. In some embodiments, the association may be a tree structure that allows the user or other members of the tree structure to provide inheritance settings for other members of the tree structure. In other embodiments, the user may control the purchasing capabilities of the additional users and control the content provided to the additional users as discussed above.

In another embodiment, managing 406 one or more aspects of the user's relationship with the one or more media devices and/or the one or more of media content providers comprises allowing the user to identify desired content or services to be provided to the media devices. For example, the user may identify podcasts and other types of content for the media devices 202. The user may also specify that one or more media devices 202 may access a collection of picture as previously discussed.

In still further embodiments, managing 406 one or more aspects of the user's relationship with the one or more media devices and/or the one or more of media content providers comprises providing for a single point for facilitating billing and payment relationships between the media devices and the media content providers. For example, the service center 212 may provide billing and payment services for paid content or services provided by one or more of the media content providers 204. The service center 212 may determine how often a fee should be provided for the paid content or services and then may provide the fee at the appropriate time interval. In other embodiments, the service center 212 may determine the actual amount of usage of a particular service and may then provide payment based on the usage as previously discussed.

Embodiments herein may comprise a special purpose or general-purpose computer including various computer hardware. Portable media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A service center for interfacing a plurality of media devices associated with a user to a plurality of media content providers, comprising:
   one or more processors; and
   one or more computer readable storage devices storing the following:
      an account management module that stores account information for a user, the account information including:
         an identification of each of a plurality of media devices associated with the user; and
         configuration settings to apply to each of the plurality of media devices such that each of the plurality of media devices is configured similarly, the configuration settings specifying a plurality of media content providers from which the user desires to receive media content, and including settings to enable each of the plurality of media devices to access content from each of the plurality of media content providers; and
      a billing module that stores billing information for the user, the billing information including:
         a payment account for the user; and
         an indication of at least one of the plurality of media content providers at which the service center is authorized to use the payment account to purchase media content for the user;
      wherein when the user accesses media content requiring purchase, from any of the plurality of media content providers, on any of the plurality of media devices, the billing module automatically arranges for payment to the media content provider for the access using the payment account.

2. The service center in accordance with claim 1, further comprising a content management module that receives input from the user that specifies media content that the user desires to receive at any of the plurality of media device and determines which of the plurality of media content providers can provide the specified media content, wherein in response to receiving such input, the content management module in conjunction with the account management module applies configuration settings to each of the plurality of media devices to enable the plurality of media devices to receive the specified media content from the determined media content providers.

3. The service center in accordance with claim 1, wherein the account information stored by the account management module further includes an identification of one or more other users associated with the user that are authorized to use at least one of the plurality of media devices to access media content by using the service center.

4. The service center in accordance with claim 3, wherein the account management module represents the association between the user and the one or more other users using a hierarchical tree structure.

5. The service center in accordance with claim 3, wherein the account information stored by the account management module further includes content or purchasing restrictions for the one or more other users that limit the one or more other users' ability to purchase media content and to receive media content respectively.

6. A method, performed by a service center for interfacing a plurality of media devices associated with a user to a plurality of media content providers, the method comprising:

receiving account information from a user, the account information including an identification of each of a plurality of media devices associated with the user;

receiving media content provider information from the user, the media account information identifying a plurality of media content providers from which the user desires to receive content on any of the plurality of media device;

receiving billing information from the user, the billing information including:
  a payment account for the user; and
  an indication of at least one of the plurality of media content providers at which the service center is authorized to use the payment account to purchase media content for the user;

storing the account information, media content provider information, and billing information;

determining configuration settings to apply to each of the plurality of media devices to enable each of the plurality of media devices to receive content from each of the plurality of media content providers defined in the media content provider information; and applying the configuration settings to each of the plurality of media devices so that each of the plurality of media devices is configured similarly to receive content from each of the plurality of media content providers.

7. The method in accordance with claim 6, further comprising:
  associating one or more additional users with the account information of the user; and
  associating at least one of the plurality of media devices with each of the additional users to enable each of the additional users to receive media content from the plurality of media content providers on the corresponding associated media devices.

8. The method in accordance with claim 7, further comprising:
  receiving content and purchasing restrictions for the one or more additional user; and
  storing the content and purchasing restrictions to restrict the one or more additional users' ability to receive or purchase media content from the plurality of media content providers.

9. The method in accordance with claim 6, further comprising:
  receiving desired content information that specifies media content that the user desires to receive at any one of the plurality of media devices;
  determining which of the plurality of media content providers can provide the desired media content; and
  configuring the plurality of media devices to receive the desired content from the determined media content providers.

10. The method in accordance with claim 6 farther comprising:
  tracking. an amount of media content received at any of the plurality of media devices from a particular media content provider; and
  automatically authorizing payment to the particular media content provider for the amount of media content received using the stored billing information.

11. The method in accordance with claim 6 further comprising:
  identifying one or more media content providers that provide content or services for a fee;
  determining how often the fee should be provided to the one or more media content providers; and
  providing the fee to the one or more media content providers at the appropriate time interval.

12. The method in accordance with claim 6, wherein the plurality of media devices include one of a satellite radio device, a portable audio player, a portable DVD or CD player, a personal computer, a server computer, a laptop computer, a cellular telephone, a personal digital assistant (PDA), or any combination thereof.

* * * * *